(12) United States Patent
Ikeda

(10) Patent No.: US 7,778,772 B2
(45) Date of Patent: Aug. 17, 2010

(54) TRAVEL CONTROL SYSTEM FOR TRAVEL VEHICLE

(75) Inventor: Tomoaki Ikeda, Kariya (JP)

(73) Assignee: Kabushiki Kaisha Toyota Jidoshokki, Aichi-ken (JP)

( * ) Notice: Subject to any disclaimer, the term of this patent is extended or adjusted under 35 U.S.C. 154(b) by 712 days.

(21) Appl. No.: 11/728,746

(22) Filed: Mar. 26, 2007

(65) Prior Publication Data

US 2007/0225906 A1   Sep. 27, 2007

(30) Foreign Application Priority Data

Mar. 27, 2006 (JP) ............................ P2006-085525

(51) Int. Cl.
*G01C 21/00* (2006.01)
(52) U.S. Cl. ........................ 701/208; 701/200; 701/201
(58) Field of Classification Search ......... 701/200–202, 701/208, 24; 340/988; 180/167–170
See application file for complete search history.

(56) References Cited

U.S. PATENT DOCUMENTS 4,996,468 A * 2/1991 Field et al. .................. 318/587

6,246,932 B1 * 6/2001 Kageyama et al. ............ 701/24

FOREIGN PATENT DOCUMENTS

| JP | 10-143242 | 5/1998 |
| JP | 2002-351543 | 12/2002 |

* cited by examiner

*Primary Examiner*—Yonel Beaulieu
(74) *Attorney, Agent, or Firm*—Locke Lord Bissell & Liddell LLP

(57) ABSTRACT

A travel control system for controlling a first travel vehicle which travels on a first travel course toward a junction between the first travel course and a second travel course and a second travel vehicle which travels on the second travel course toward the junction in a travel course network comprising the junction, includes a counter for counting a number of the first travel vehicle which exists in a predetermined junction area comprising the junction, and a travel regulator for stopping the second travel vehicle before the junction area when the counted number of the first travel vehicle is one or more. The travel regulator advances the second travel vehicle into the junction area when the counted number of the first travel vehicle is zero.

12 Claims, 6 Drawing Sheets

TRAVEL CONTROL SYSTEM FOR TRAVEL VEHICLE

BACKGROUND OF THE INVENTION

The present invention relates to a travel control system for a travel vehicle which is suitable for automatically carrying assembly parts in a factory.

As a conventional technique, when first and second vehicles respectively travel on first and second travel courses toward a junction between the first and second travel courses in a travel course network having the junction, one of the first and second travel courses is stopped before the junction and the other keeps on traveling toward the junction depending on the situation (cf. Japanese Patent Application Publication No. 2002-351543).

However, the above technique is hard to deal with the situation where the first travel vehicle should travel in priority to the second travel vehicle at the junction between the first and second travel courses.

The present invention, which is made in view of the above problem, is directed to a travel control system, which when first and second travel vehicles respectively travel on first and second travel courses toward a junction between the first and second travel courses in a travel course network having the junction, easily achieves that the first travel vehicle travels in priority to the second travel vehicle.

SUMMARY OF THE INVENTION

A first aspect according to the present invention provides a travel control system for controlling a first travel vehicle which travels on a first travel course toward a junction between the first travel course and a second travel course and a second travel vehicle which travels on the second travel course toward the junction in a travel course network comprising the junction. The system includes counting means for counting a number of the first travel vehicle which exists in a predetermined junction area comprising the junction, and regulator means for stopping the second travel vehicle before the junction area when the counted number of the first travel vehicle is one or more. The regulator means advances the second travel vehicle into the junction area when the counted number of the first travel vehicle is zero.

A second aspect according to the present invention provides a travel control system for managing traffic on a travel course network comprising at least two travel courses and at least one junction between the two travel courses. The system includes at least two travel vehicles adapted to travel along the travel courses; a detector configured to detect one or more first travel vehicles within a predetermined area comprising the junction; a signal sender adapted to send a detection signal when one or more first travel vehicles are detected and one or more second travel vehicles traveling toward the predetermined area, and an advancement signal when one or more first travel vehicles are not detected; a signal receiver in communication with one or more second travel vehicles and configured to receive the detection and advancement signals from the signal sender; and an actuator adapted in response to the detection signal received by the signal receiver to stop the second travel vehicle before the predetermined area when one or more first travel vehicles are in the predetermined area, and adapted in response to the advancement signal received by the signal receiver to advance the second travel vehicle into the predetermined area when the one or more first travel vehicles are not longer detected in the predetermined area.

A third aspect according to the present invention provides a system for controlling at least two travel vehicles which travel on at least two travel courses in a travel course network comprising at least one junction. The system includes a counter configured to count a number of a first one of the travel vehicles which exists in a predetermined junction area comprising the junction, and a travel regulator configured to stop a second one of the travel vehicles before the predetermined junction area when the counted number of the first one of the travel vehicles is one of more and configured to advance the second one of the travel vehicles into the predetermined junction area when the counted number of the first one of the travel vehicles is zero.

Other aspects and advantages of the invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention together with objects and advantages thereof, may best be understood by reference to the following description of the presently preferred embodiments together with the accompanying drawings in which:

DETAILED DESCRIPTION OF THE PREFERRED EMBODIMENTS

The following will describe in detail a travel control system for a travel vehicle according to a preferred embodiment of the present invention with reference to FIGS. 1 through 5.

Figure 1:
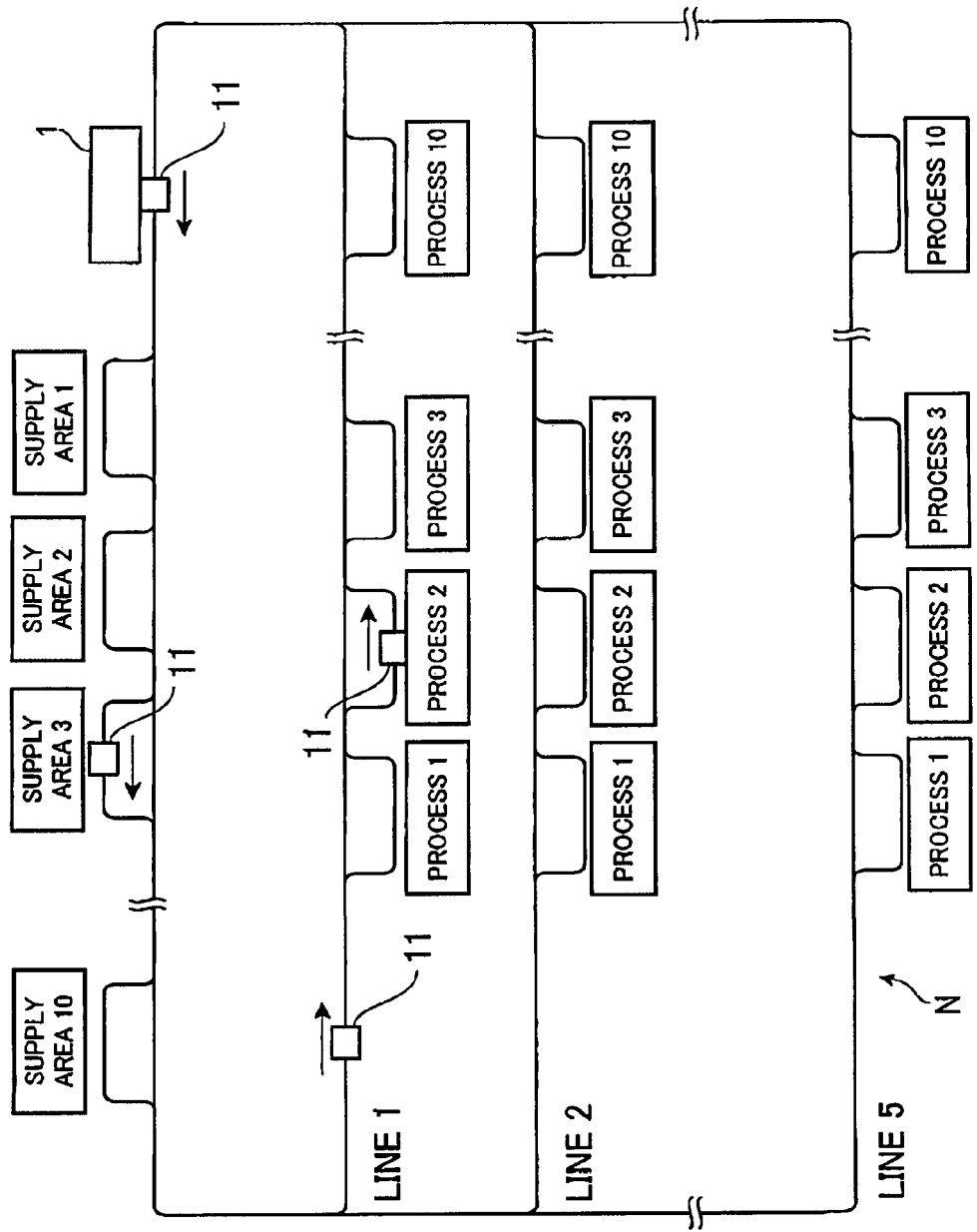
FIG. 1 is a view of a layout of a factory in which a travel control system for a travel vehicle and the travel vehicle of a preferred embodiment according to the present invention are used.

FIG. 1 is a view of the layout of a factory in which the travel control system for the travel vehicle of the preferred embodiment are used. For example, various models of forklift trucks are manufactured in the factory. Referring to FIG. 1, a travel course network N is formed by magnetic tape on the floor surface of the factory for an automated guided vehicle 11 to travel automatically. The travel course network N comprises supply areas 1 through 10 where assembly parts are supplied to the automated guided vehicle 11, lines 1 through 5 in which different models of forklift trucks (or products) are manufactured depending on assembly parts, and process 1 through 10 to which assembly parts are provided from the automated guided vehicle 11 in each of the lines 1 through 5 and in which the assembly parts are assembled. It is noted that the number of the lines, the number of the processes and the number of the supply areas are not limited to the above numbers.

An issuing machine (or a destination information provider) 1 is provided in the travel course network N upstream of the supply areas 1 through 10 for issuing a destination information card to the automated guided vehicle 11. The destination information card is a recording medium which records data according to models of forklift trucks, and includes destination information indicating to which of the supply areas 1 through 10 the lines 1 through 5 and the processes 1 through 10 the automated guided vehicle 11 is to travel. An IC chip, a bar-cord, printing using leuco dye or the like is used for recording the above data in the destination information card. Other than issuing to the automated guided vehicle 11 the destination information card which stores the data therein, data may be communicated from the issuing machine 1 to a destination information card which is set in the automated guided vehicle 11, and recorded therein.

One example of travel of the automated guided vehicle 11 in the travel course network N will now be described. The destination information card is issued by the issuing machine 1 and set at a predetermined place of the automated guided vehicle 11. The automated guided vehicle 11 reads out the data which are recorded in the destination information card. When information indicating the supply area 3, the line 1 and the process 2 are recorded as destination information in the destination information card, the automated guided vehicle 11 is supplied with assembly parts at the supply area 3. The automated guided vehicle 11 carrying the assembly parts then advances to the line 3 and provides the assembly parts to the process 2. Then, the automated guided vehicle 11 returns to the issuing machine 1.

Figure 2:
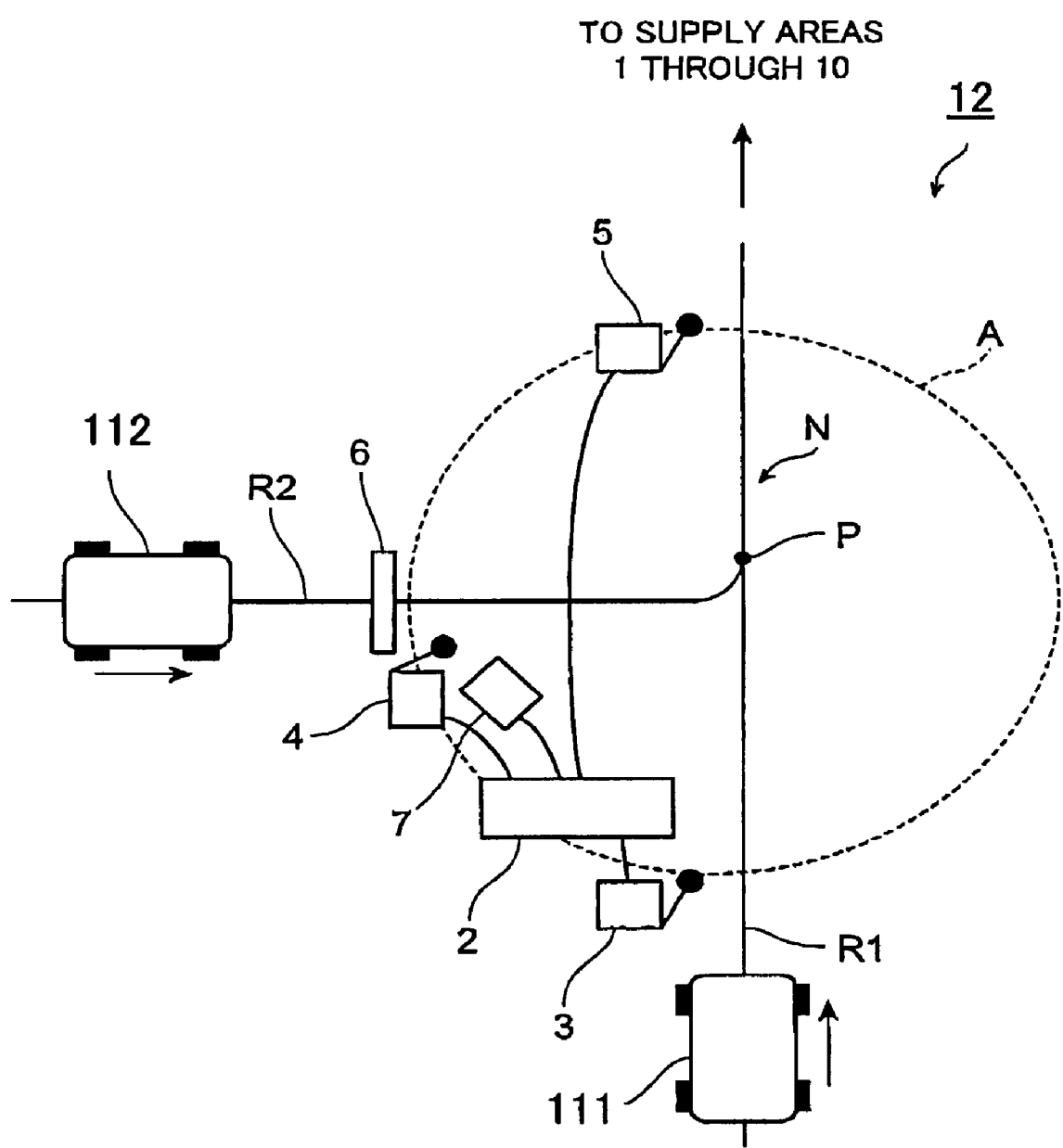
FIG. 2 is a schematic view of the travel control system for an automated guided vehicle as the travel vehicle of the preferred embodiment.

The following will describe a travel control system 12 for the automated guided vehicle 11 with reference to FIG. 2. FIG. 2 shows an area of the travel course network N adjacent to a junction P between a travel course (or a first travel course) R1 which leads from the line 5 toward the issuing machine 1 and a travel course (or a second travel course) R2 which forms any of the lines 1 through 4. At the junction P, the travel course R2 joins the travel course R1. The travel control system 12 controls traveling of an automated guided vehicle (or a first travel vehicle) 111 which travels on the travel course R1 downstream of the junction P toward the junction P and traveling of an automated guided vehicle (or a second travel vehicle) 112 which travels on the travel course R2 toward the junction P in the travel course network N having the junction P. More specifically, the travel control system 12 controls the traveling of the automated guided vehicles 111 and 112 so that the automated guided vehicle 111 travels in priority to the automated guided vehicle 112.

Still referring to FIG. 2, the travel control system 12 includes as counting means a counter 2 for counting a number of the automated guided vehicles 111 and 112 which exist in an predetermined junction area A having the junction P, a limit switch 3 as a first limit switch for increasing a value of the counter 2 by one each time the automated guided vehicle 111 enters the junction area A, a limit switch 4 as a second limit switch for increasing the value of the counter 2 by one each time the automated guided vehicle 112 enters the junction area A, and a limit switch 5 as a third limit switch for decreasing the value of the counter 2 by one each time any of the automated guided vehicles 111 and 112 exits from the junction area A.

In addition, the travel control system 12 includes as a travel regulator or regulator means a stop marker 6 which is formed by magnetic tape on the floor surface of the factory for stopping the automated guided vehicle 112 before the junction area A, and an infrared projector 7 which sends out an infrared signal to the automated guided vehicle 112 for instructing the automated guided vehicle 112 to advance into the junction area A. When the value of the counter 2 is one or more, the infrared projector 7 does not send out the infrared signal. When the value of the counter 2 is zero, the infrared projector 7 sends out the infrared signal. It is noted that the automated guided vehicle 112 prioritizes an advancement instruction by the infrared projector 7 over a stopping instruction by the stop marker 6.

Figure 3:
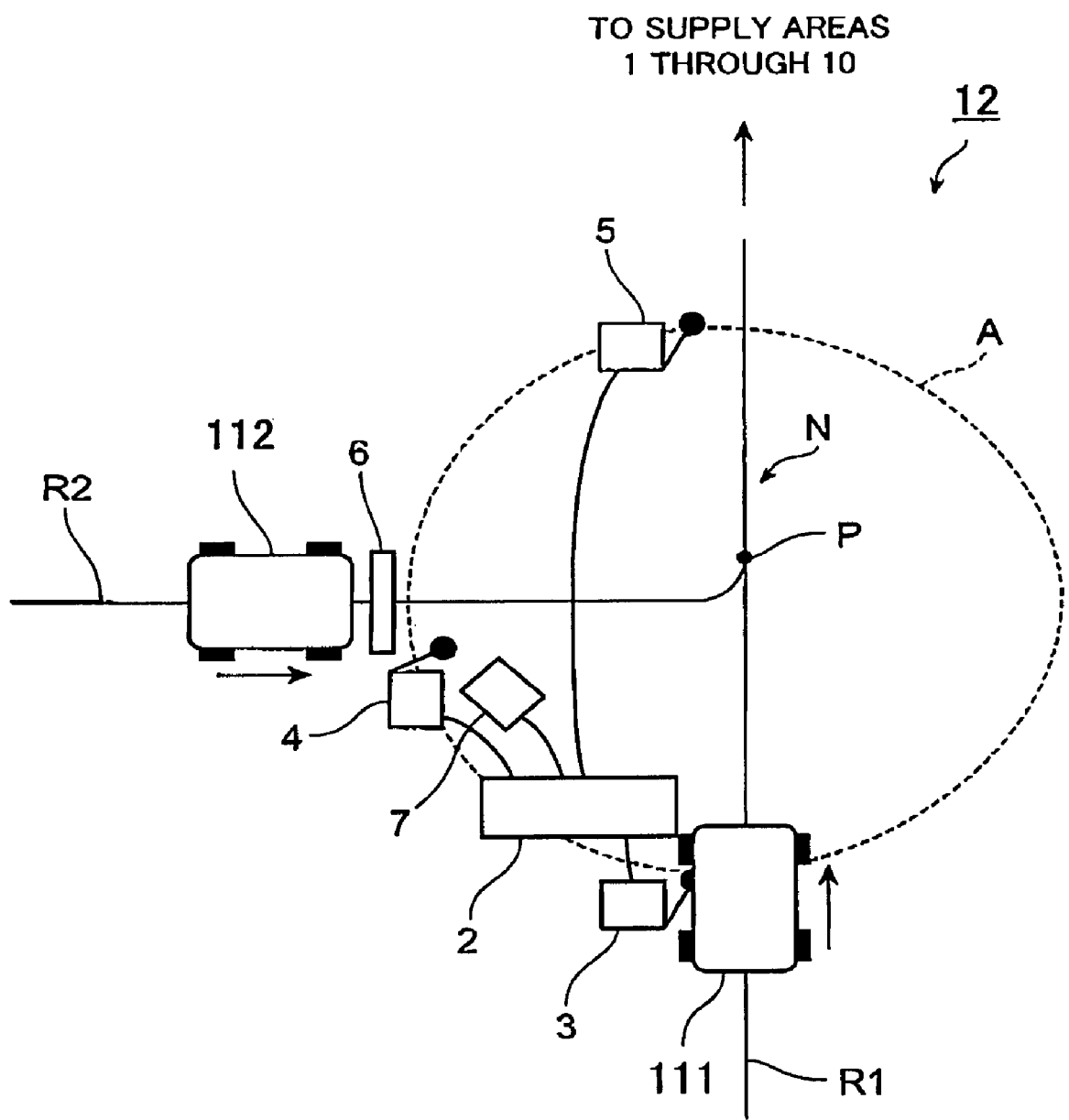
FIG. 3 is a first view showing the operation of the automated guided vehicle by travel control system.
Figure 4:
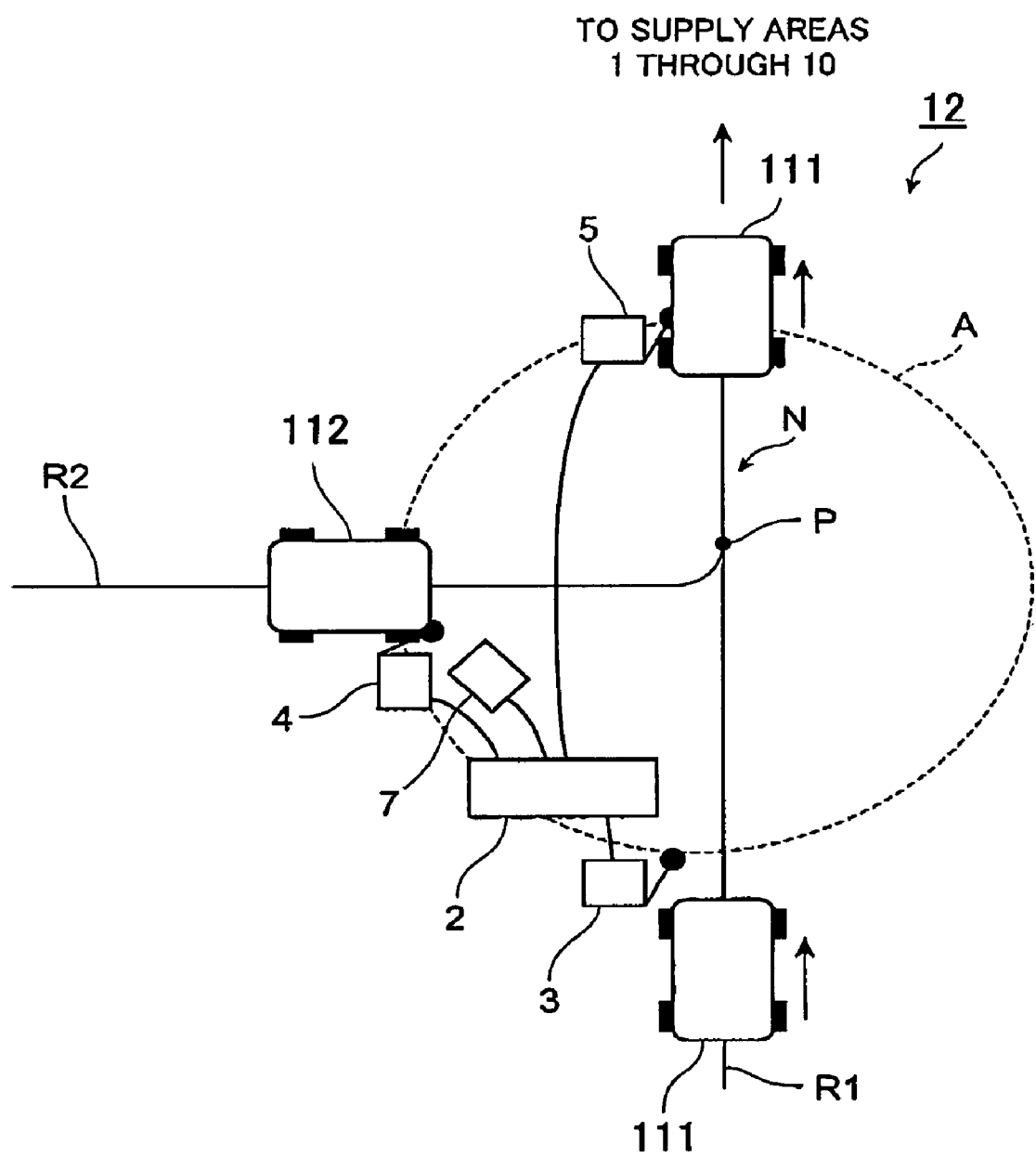
FIG. 4 is a second view showing the operation of the automated guided vehicle by travel control system.
Figure 5:
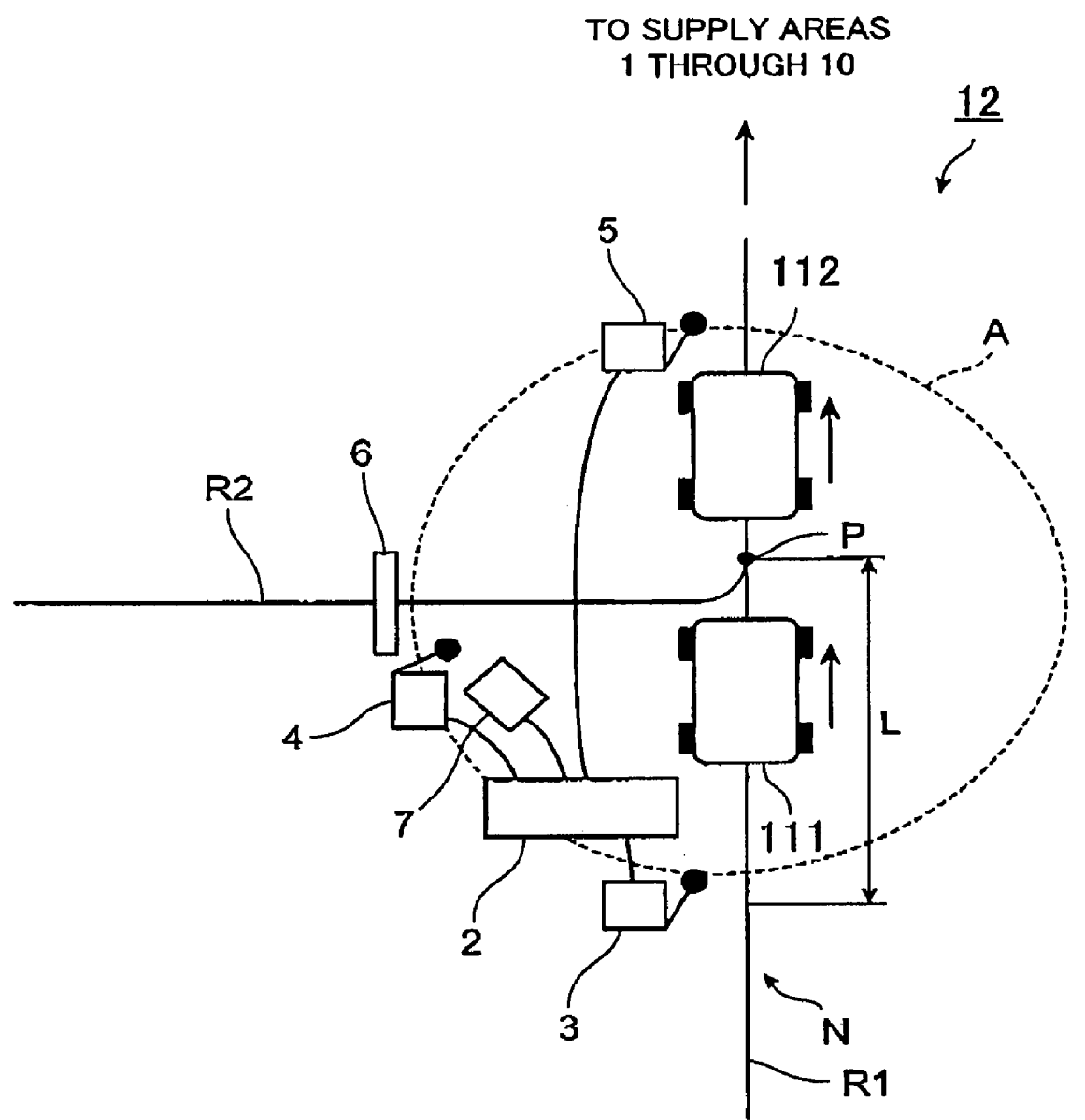
FIG. 5 is a third view showing the operation of the automated guided vehicle by travel control system.

The following will describe the operation of the automated guided vehicles 111 and 112 by the travel control system 12 with reference to FIGS. 3 through 5.

Referring to FIG. 3, the automated guided vehicle 111 travels on the travel course R1 downstream of the junction P toward the junction P and the automated guided vehicle 112 travels on the travel course R2 toward the junction P. When the automated guided vehicle 111 enters the junction area A prior to the automated guided vehicle 112, the limit switch 3 increases the value of the counter 2 by one. Thus, the number of the automated guided vehicle 111 which exists in the junction area A is counted as one. As described above, when the values of the counter 2 is one or more, the infrared projection 7 does not send out to the automated guided vehicle 112 the infrared signal which instructs the automated guided vehicle 112 to advance to the junction area A. Thus, the automated guided vehicle 112 is stopped before the junction area A by the stop marker 6.

Referring to FIG. 4, subsequently, when the automated guided vehicle 111 which has entered the junction area A prior to the automated guided vehicle 112 exits from the junction area A, the limit switch 5 decreases the value of the counter 2 by one. Thus, the number of the automated guided vehicle 111 which exists in the junction area A is counted as zero. As described above, when the value of the counter 2 is zero, the infrared projector 7 sends out to the automated guided vehicle 112 the infrared signal which instructs the automated guided vehicle 112 to advance into the junction area A. Thus, the automated guided vehicle 112 which has been stopped by the stop marker 6 advances into the junction area A in this case. At this time, the limit switch 4 increases the value of the counter 2 by one, thus the number of the automated guided vehicle 112 in the junction area A being counted as one.

It is noted that a distance L between the junction P and the limit switch 3 is set so that when another automated guided vehicle 111 enters the junction area A immediately after the automated guided vehicle 112 enters the junction area A, the another automated guided vehicle 111 passes through the junction P after the automated guided vehicle 112 passes through the junction P as shown in FIG. 5. In addition to the distance L, the distances between the junction P and the stop marker 6 and between junction P and the limit switch 5 are optionally determined according to the traveling speeds and the overall lengths of the automated guided vehicles 111 and 112 so that the automated guided vehicles 111 and 112 are prevented from colliding with each other.

The reason why the limit switch 4 increases the value of the counter 2 by one when the automated guided vehicle 112 enters the junction area A is as follows. It is assumed that the limit switch 4 does not increase the value of the counter 2 by one. In the case where the automated guided vehicle 111 advances into the junction area A after the automated guided vehicle 112 advances into the junction area A, the automated guided vehicle 112 exits from the junction area A, so that the limit switch 5 decreases the value of the counter 2 by one to be zero. Namely, the number of the automated guided vehicle 111 which exists in the junction area A is counted as zero even when the automated guided vehicle 111 exists in the junction area A. Therefore, another automated guided vehicle 112 can advance into the junction area A, and the automated guided vehicles 111 and 112 may collide with each other.

As described above, in the travel control system 12 for the automated guided vehicle 11, the number of the automated guided vehicles 111 and 112 which exist in the junction area A having the junction P is counted by the counter 2 and the limit switches 3 through 5. When the value of the counter 2 is one or more, the automated guided vehicle 112 is stopped before the junction area A by the stop marker 6. When the value of the counter 2 is zero, the automated guided vehicle 112 is advanced into the junction area A by the infrared projector 7. Therefore, when the automated guided vehicle 111 travels on the travel course R1 downstream of the junction P toward the junction P and the automated guided vehicle 112 travels on the travel course R2 toward the junction P, it is easily achieved that the automated guided vehicle 111 travels in priority to the automated guided vehicle 112. This renders control system, travel route information and the like unnecessary and makes the travel control system respond flexibly to modification of the layout of the travel course network N.

The present invention is not limited to the preferred embodiment described above but may be modified into alternative embodiments as exemplified below.

The automated guided vehicles are used as first and second travel vehicles of the present invention in the preferred embodiment described above. However, the first and second travel vehicles of the present invention may be a manned travel vehicle or a travel vehicle which does not carry assembly parts. For example, the first and second travel vehicles of the present invention may be a manned vehicle, an unmanned vehicle, a wired vehicle, a wireless vehicle, a forklift truck, an electric vehicle, a hand truck, a tow car or the like.

Figure 6:
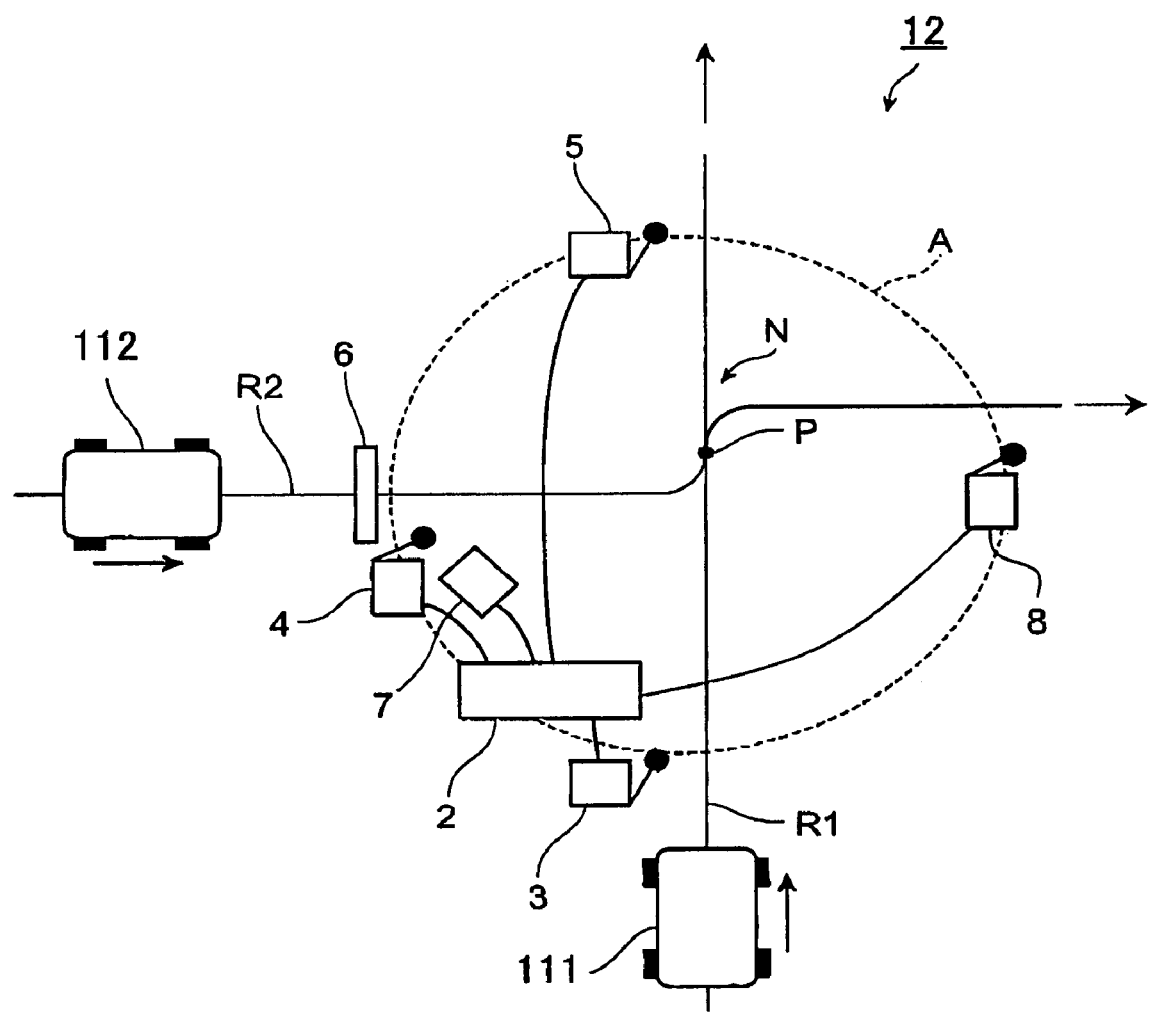
FIG. 6 is a schematic view of a travel control system for an automated guided vehicle according to an alternate embodiment.

In the preferred embodiment described above, the travel course R2 joins the travel course R1 at the junction P. Alternatively, the travel courses R1 and R2 may cross at the junction P as shown in FIG. 6 in which the travel control system 8 further includes a limit switch 8 for decreasing the value of the counter 2 by one each time the automated guided vehicle exits from the junction area A. Three travel courses or more may be joined or cross at the junction. The travel control system of the present invention is applicable to all of the junctions where the travel courses are joined or cross in the travel course network.

In the preferred embodiment described above, the counter 2 and the limit switches 3 through 5 as counting means cooperate to count the number of the automated guided vehicles 111 and 112 which exist in the junction area A. However, the present invention is not limited thereto. For example, the counting means of the present invention may communicate with the automated guided vehicles 111 and 112 for counting the number of the automated guided vehicles 111 and 112 which exist in the junction area A. Alternatively, pictures of the inside of the junction area A may be taken by a camera and processed for counting the number of the automated guided vehicles 111 and 112 which exist in the junction area A. A personal computer, a programmable logic controller (PLC) or the like may be used as counting means. Instead of the limit switch, a photoelectric sensor, a proximity sensor, a laser sensor, an ultrasonic sensor, an infrared sensor, a temperature sensor, a pressure sensor or the like may be used.

The travel regulator of the present invention may once stop the automated guided vehicle 112 before the junction area A. Then, the travel regulator keeps the automated guided vehicle 112 stopped before the junction area A when the number of the automated guided vehicle 111 which is counted by the counting means is one or more. The travel regulator advances the automated guided vehicle 112 into the junction area A when the number of the automated guided vehicle 111 which is counted by the counting means is zero. The travel regulator may use a laser signal, a wireless signal, a wire signal or the like.

Therefore, the present examples and embodiments are to be considered as illustrative and not restrictive, and the invention is not to be limited to the details given herein but may be modified within the scope of the appended claims.

What is claimed is:

1. A travel control system for controlling a first travel vehicle which travels on a first travel course toward a junction between the first travel course and a second travel course and a second travel vehicle which travels on the second travel course toward the junction in a travel course network comprising the junction, the travel control system comprising:
   counting means for counting a number of the first travel vehicle which exists in a predetermined junction area comprising the junction; and
   regulator means for stopping the second travel vehicle before the junction area when the counted number of the first travel vehicle is one or more, the regulator means advancing the second travel vehicle into the junction area when the counted number of the first travel vehicle is zero.

2. The travel control system according to claim 1, wherein the regulator means keeps the second travel vehicle stopped when the counted number of the first travel vehicle is one or more after once stopping the second travel vehicle before the junction area, and the regulator means advances the second travel vehicle into the junction area when the counted number of the first travel vehicle is zero after once stopping the second travel vehicle before the junction area.

3. The travel control system according to claim 1, wherein the second travel course joins the first travel course at the junction.

4. The travel control system according to claim 1, wherein the first and second travel courses cross at the junction.

5. The travel control system according to claim 1, wherein the first and second travel vehicles each comprise an automated guided vehicle operable to travel automatically.

6. The travel control system according to claim 1, wherein the counting means comprises a counter and a plurality of limit switches.

7. The travel control system according to claim 6, wherein the plurality of limit switches comprises:
   a first limit switch for increasing a value of the counter by one each time the first travel vehicle enters the junction area,
   a second limit switch for increasing the value of the counter by one each time the second the vehicle enters the junction area, and
   a third limit switch for decreasing the value of the counter by one each time any of the first and second travel vehicles exits from the junction area.

8. The travel control system according to claim 1, wherein the regulator means comprises a stop marker and an infrared projector.

9. The travel control system according to claim 8, wherein the infrared projector sends out an infrared signal to the second travel vehicle when the counted number of the first travel vehicle is zero.

10. The travel control system according to claim 8, wherein the stop marker is formed on a floor surface of a factory by magnetic tape.

11. A travel control system for managing traffic on a travel course network comprising at least two travel courses and at least one junction between the two travel courses, the system comprising:
- at least two travel vehicles adapted to travel along the travel courses;
- a detector configured to detect one or more first travel vehicles within a predetermined area comprising the junction;
- a signal sender adapted to send a detection signal when one or more first travel vehicles are detected and one or more second travel vehicles traveling toward the predetermined area, and an advancement signal when one or more first travel vehicles are not detected;
- a signal receiver in communication with one or more second travel vehicles and configured to receive the detection and advancement signals from the signal sender; and
- an actuator adapted in response to the detection signal received by the signal receiver to stop the second travel vehicle before the predetermined area when one or more first travel vehicles are in the predetermined area, and adapted in response to the advancement signal received by the signal receiver to advance the second travel vehicle into the predetermined area when the one or more first travel vehicles are not longer detected in the predetermined area.

12. A system for controlling at least two travel vehicles which travel on at least two travel courses in a travel course network comprising at least one junction, the system comprising:
- a counter configured to count a number of a first one of the travel vehicles which exists in a predetermined junction area comprising the junction; and
- a travel regulator configured to stop a second one of the travel vehicles before the predetermined junction area when the counted number of the first one of the travel vehicles is one or more and configured to advance the second one of the travel vehicles into the predetermined junction area when the counted number of the first one of the travel vehicles is zero.

* * * * *